United States Patent [19]
Burger et al.

[11] Patent Number: 5,538,168
[45] Date of Patent: Jul. 23, 1996

[54] SWING-OUT SPARE TIRE ASSEMBLY

[75] Inventors: Edgar P. Burger; Robert J. Burger, both of Redford, Mich.

[73] Assignee: Valley Industries, Madison Heights, Mich.

[21] Appl. No.: 307,058

[22] Filed: Sep. 16, 1994

[51] Int. Cl.⁶ .................................................. B62D 43/02
[52] U.S. Cl. .................. 224/42.210; 224/42.24; 224/42.26; 224/42.28; 296/51
[58] Field of Search .................. 224/42.12, 42.13, 224/42.21, 42.24, 42.26, 42.28; 296/37.2, 51

[56] References Cited

U.S. PATENT DOCUMENTS

| | | | |
|---|---|---|---|
| 4,282,994 | 8/1981 | Hilliard | 224/42.21 |
| 4,410,117 | 10/1983 | Crawford et al. | |
| 4,561,575 | 12/1985 | Jones | |
| 4,679,717 | 7/1987 | Hansen | |
| 4,771,926 | 9/1988 | Anderson et al. | 224/42.13 |
| 4,817,834 | 4/1989 | Weiler | |
| 4,869,409 | 9/1989 | Wright | |
| 4,971,237 | 11/1990 | Davis | 296/37.2 |
| 4,993,610 | 2/1991 | Abretske et al. | 224/42.13 |
| 5,020,707 | 6/1991 | Nozel et al. | 224/42.24 |
| 5,186,371 | 2/1993 | Jozefczak et al. | 224/42.21 |
| 5,358,157 | 10/1994 | Abretske | 224/42.13 |
| 5,370,285 | 12/1994 | Steelman | 224/42.12 |

FOREIGN PATENT DOCUMENTS

| | | | |
|---|---|---|---|
| 59-32571 | 2/1984 | Japan | 224/42.12 |
| 699859 | 4/1994 | Japan | 224/42.21 |
| 330350 | 7/1958 | Switzerland | 224/42.21 |
| 2197831 | 6/1988 | United Kingdom | 224/42.12 |

*Primary Examiner*—Henry J. Recla
*Assistant Examiner*—Charles R. Eloshway
*Attorney, Agent, or Firm*—Gifford, Krass, Groh, Sprinkle, Patmore, Anderson & Citkowski

[57] ABSTRACT

A spare tire assembly is provided which is securely mounted to the frame of a vehicle. The assembly includes a swing arm which is pivotally moveable between an open position extending laterally away from the vehicle and a closed position securely attached to the rear door of the vehicle. A latch mechanism allows for the detachable connection of the assembly to the rear door such that the assembly can be securely fastened to the rear door to prevent the movement of the spare tire assembly while the vehicle is in motion. The latch mechanism includes a spring biased handle which provides for the manual release of the swing arm and allows for the displacement of the swing arm away from the vehicle door.

11 Claims, 2 Drawing Sheets

SWING-OUT SPARE TIRE ASSEMBLY

BACKGROUND OF THE INVENTION

I. Field of the Invention

This invention relates to spare tire assemblies for vehicles, in general, and more particularly to a novel spare tire assembly that is adapted to securely fasten to the frame of a vehicle.

II. Description of the Relevant Art

Spare tires are almost always provided as standard equipment with most vehicles. In most passenger vehicles, the spare tire is located in the trunk or cargo compartment. Since most of these vehicles are utilized mainly for the movement of passengers, the trunk space is often under-utilized and the positioning of a spare tire in the trunk rarely occupies needed space. However, the situation with respect to light trucks, sport-utility and recreational vehicles, is much different. Due to the nature of these vehicles, interior storage space is often highly valued and an interior positioned spare tire would result in the waste of such precious space. As a result, external spare-tire carriers are often useful attachments for such vehicles.

One type of external spare tire carrier which has been developed enables a spare tire to be mounted below or underneath the vehicle. However, this approach has proven quite problematic for a number of reasons. A tire mounted below the vehicle reduces the vehicle's road clearance. This may prevent the vehicle from entering into rough areas which require that the vehicle maintain a certain ground clearance. Also, the tire may occupy space needed for a secondary fuel tank.

A second and more popular type of spare tire carrier are those that are secured to the rear of vehicles, either by attachment to the rear body panel of the vehicle or, in the alternative, by attachment to the bumper and secured to the vehicle through a body mounted latch. Examples of these carriers are disclosed in U.S. Pat. Nos. 4,679,717 to Hansen and 4,817,834 to Weiler. However, such spare tire-carriers often present a number of problems. Those carriers supported exclusively by the body panel of the vehicle tend to vibrate significantly when the vehicle is in motion. In fact, the combined forces exerted on the body panel as a result of the carrier weight and vibration may cause damage to the body panel. Carriers supported primarily through connection with the bumper and secured by a body mounted latch, while less vibratory while the vehicle is in motion, tend to place a significant amount of stress on the body mounted latch as a result of the inherent instability of the bumper attachment of the carrier. Further, mounting the carrier on the bumper typically requires extraordinary modification to the bumper.

Most conventional spare tire carriers are not suited to those vehicles whose rear lift door opens upwardly. In these vehicles, such as the Jeep Cherokee, attaching the spare tire carrier to the rear lift door of the vehicle would effectively prevent the lift door from opening and therefore would prohibit access to the rear of the vehicle.

It would be highly advantageous, therefore, to remedy the foregoing and other deficiencies in the prior art.

Accordingly, it is an object of the present invention to provide an improved spare tire carrier for vehicles.

It is a further object of the present invention to provide a spare tire carrier that is more stable and less vibratory, and will not subject the rear panel or the bumper of the vehicle to undue stress.

It is a further object of the present invention to provide a spare tire carrier that will not inhibit the operation of the lift door.

It is still a further object of the present invention to provide a spare tire carrier that is easily installed by the dealer with limited vehicle modifications and limited drilling into the vehicle.

It is still a further object of the present invention to provide a spare tire carrier in which nearly all of the weight and stress is borne by the frame of the vehicle.

SUMMARY OF THE PRESENT INVENTION

In accordance with these and many other objects, the subject invention provides for a spare tire assembly adapted to be secured to the frame of a vehicle.

Briefly, to achieve the desired objects of the invention in accordance with the preferred embodiment, first provided is a spare tire carrier assembly securely mounted primarily to the frame of the vehicle, preferably by securing the assembly to a trailer hitch, which is then connected to the frame. Alternatively, the assembly may be mounted to the frame directly. A swing arm is provided which is secured to the vehicle through a connection with a connecting device. The swing arm is adapted for pivotal movement between a closed position, next to the lift door, and an open position, extending laterally away from the vehicle and out of the way of the door. When the swing arm is in the open position, the rear door of the vehicle (or lift door) may be opened or closed without being hindered by the spare tire assembly. A latch mechanism is provided to the swing arm that allows a user to releasably engage the swing arm from the rear door of the vehicle. The latch mechanism includes a striker assembly attached to the lift door of the vehicle and a spring biased handle. To firmly secure the swing arm to the vehicle (the closed position), the latch mechanism is designed to be securely connected to the striker assembly. By exerting sufficient pressure on the spring biased handle, a user may cause the release of the latch mechanism from the striker assembly, resulting in the disengagement of the swing arm from the rear door. The swing arm may then be moved to the open position, therefore providing access to the rear of the vehicle.

BRIEF DESCRIPTION OF THE DRAWINGS

Additional objects, advantages, and features of the present invention will become apparent from the following description and appended claims, taken in conjunction with the accompanying drawings in which:

DETAILED DESCRIPTION OF A PREFERRED EMBODIMENT OF THE PRESENT INVENTION

It should be understood that the following description of the preferred embodiment is merely exemplary in nature and is in no way intended to limit the invention or its applications or uses.

Figure 1:
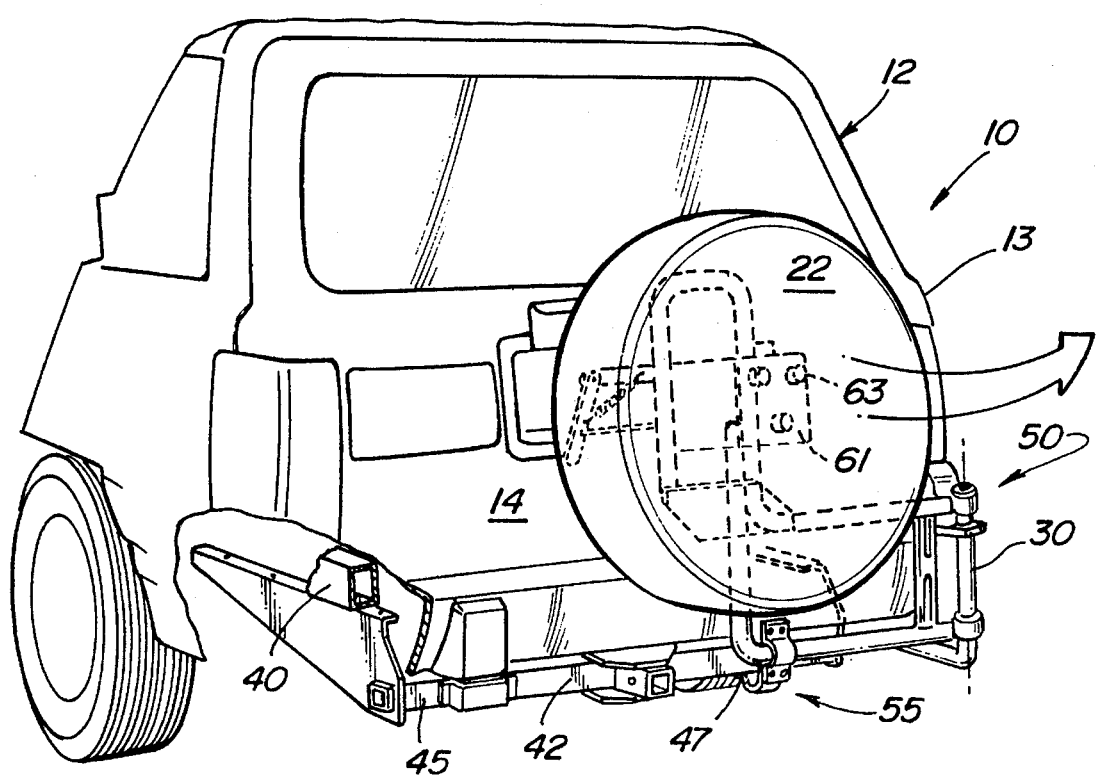
FIG. 1 shows a partially fragmented perspective view of the spare tire assembly of the present invention, shown mounted on the rear of the vehicle.

Turning now to the drawings in which like reference characters indicate corresponding elements throughout the several views, attention is first directed to FIG. 1 which illustrates a spare tire assembly, generally designated by the reference number 10, according to the present invention. The spare tire rear door 14 is shown mounted to a vehicle 12, having a body 13 with an upright rear door 14. The spare tire assembly 10 is provided with a swing arm 50 for carrying a wheel 22 on the door 14. The swing arm 50 is supported by an elongated member 30 which is secured to a hitch assembly 42 which is then, in turn, secured to a frame 40 of the vehicle 12.

The foregoing description of the vehicle 12, is intended to be typical of conventional vehicles such as sport-utility vehicles. The body 13, however, may also be representative of other types of vehicles such as recreational vehicles and pick-up trucks. In such vehicles, modifications and variations will readily occur to those skilled in the art.

Figure 2:
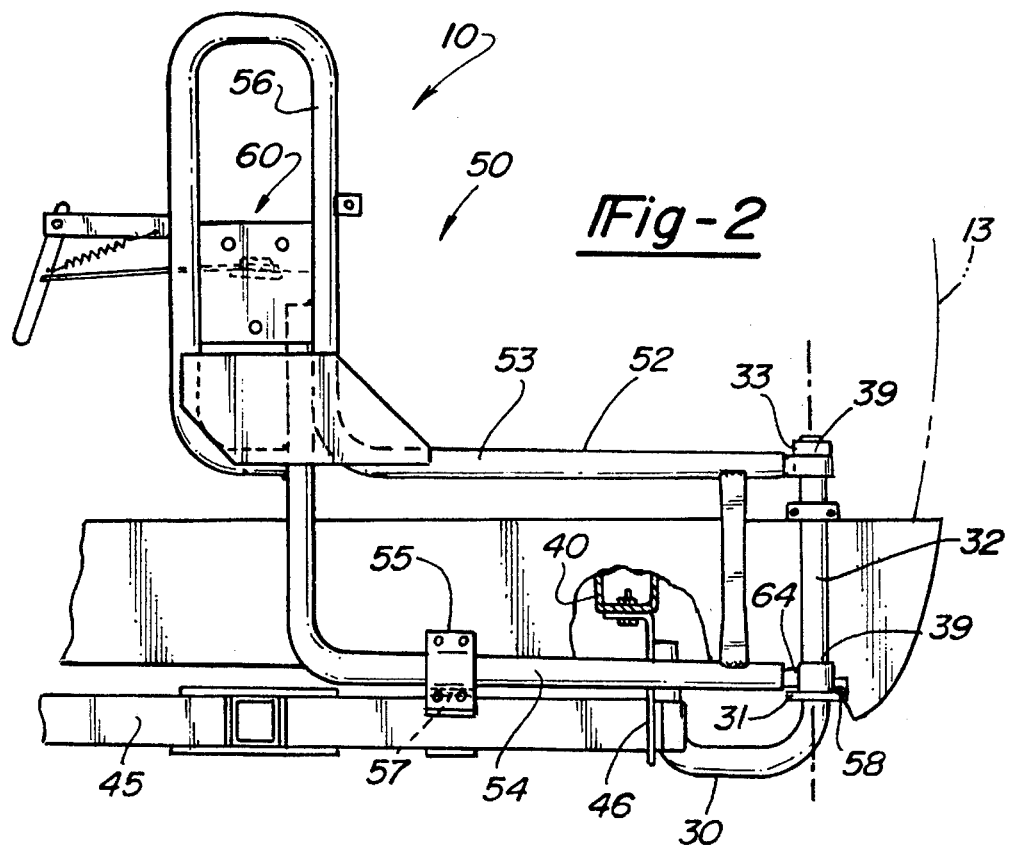
FIG. 2 shows a rear view of the spare tire assembly of the present invention.

As best seen in FIG. 2 of the drawings, the spare tire assembly includes a swing arm 50 pivotally mounted to the elongated member 30. The swing arm 50 moves between a closed position whereby the swing arm 50 is fixably secured to the rear door 14 of the vehicle 12 by a latch mechanism 66 and an open position whereby the swing arm 50 extends laterally away from the vehicle 12. The spare tire assembly 10 is designed such that the swing arm 50 can be easily pivoted away from the vehicle 12 to allow for unhindered access to the rear door 14 of the vehicle 12 and thus to the contents that may be present therein.

The swing arm 50 further includes a first section 52 parallel to the ground and extending from the elongated member 30 at one end of the vehicle 12 to near the middle of the vehicle door 14. A second section 56 of the swing arm 50 is perpendicular to and fixably secured to the first section. The first section 52 further includes an upper tube 53 and a lower tube 54, parallel and spaced apart from each other. The lower tube 54 includes a stabilizing tongue 55 having a flange 57 which extends outwardly to engage a receiving fork 34 to stabilize the assembly 10 when the assembly 10 is in the closed position. The stabilizing tongue 55 is bolted to the lower tube 54. The second section 56 includes a spare tire mounting mechanism 60 as well as the latch mechanism 66 that allows for the detachable securement of the swing arm 50 to the rear door 14.

Figure 3:
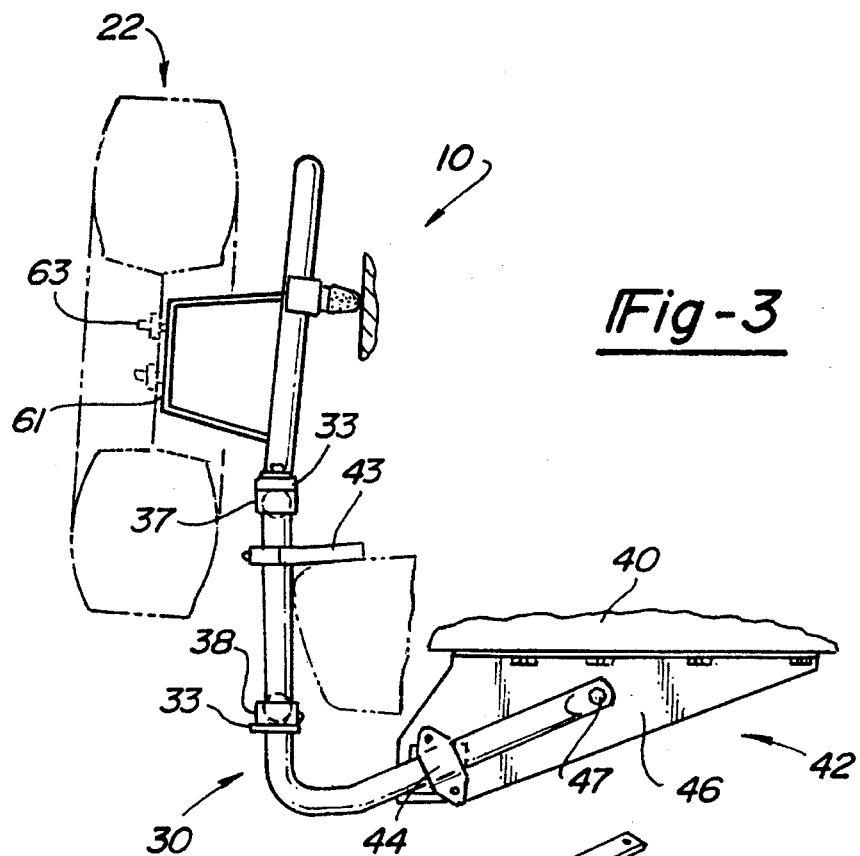
FIG. 3 shows a side elevational view of the spare tire assembly of the present invention, showing in particular the connection of the assembly to the frame of the vehicle.
Figure 4:
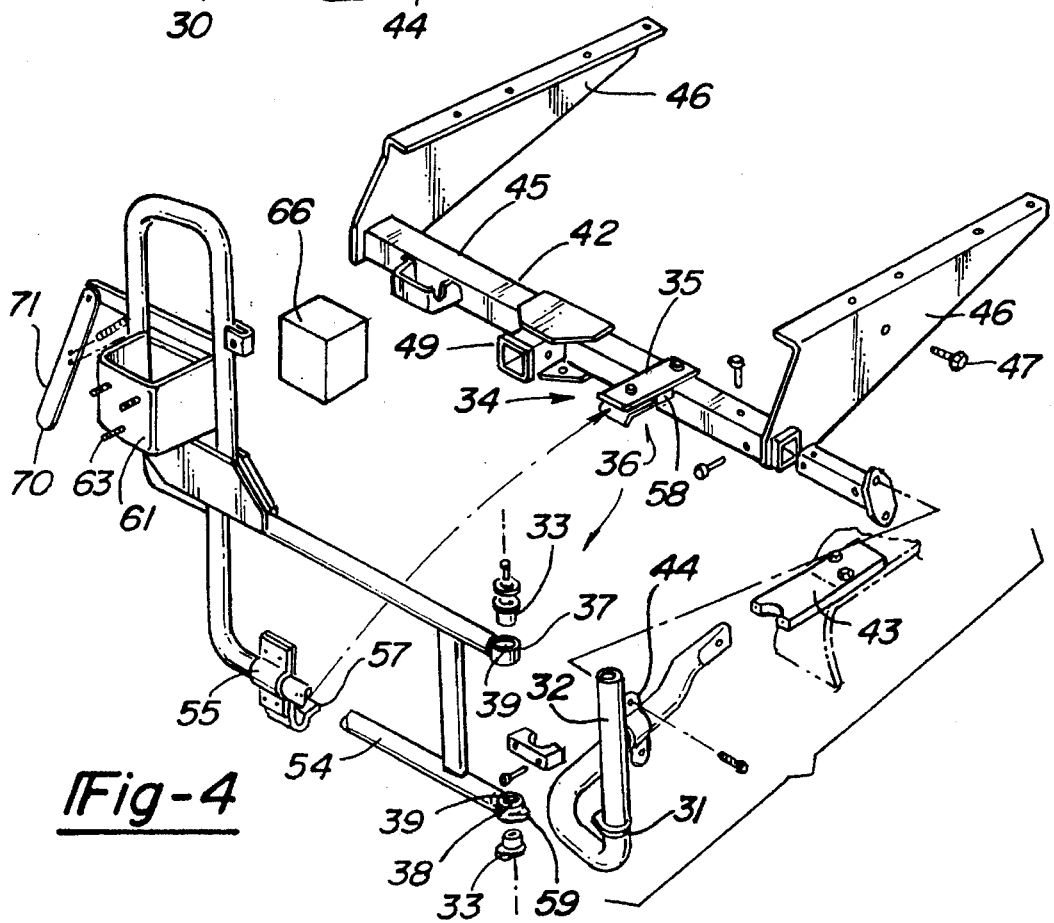
FIG. 4 shows an exploded assembly view of the spare tire assembly of the present invention.

An important aspect of the present invention is that the spare tire assembly 10 is nearly entirely supported by the frame 40 of the vehicle 12. As seen in FIG. 3, the elongated member 30 essentially extends from the assembly 10 to the underside of the vehicle 12. The elongated member 30 is fixably secured to the hitch assembly 42 which, in turn, is fixably secured to the frame 40 of the vehicle 12. As shown in FIG. 4, the hitch assembly 42 includes a transverse bar 45 having two ends, each of which is fixably secured to a flange 46. The hitch assembly 42 includes a hitch ball receiver assembly 49 which is mounted to the transverse bar 45. The flanges 46, in turn, are securely fastened to the frame 40 of the vehicle 12. Essentially, in the present invention, a collar bracket assembly 44 is secured to the elongated member 30 which in turn is bolted to one flange 46 of the hitch assembly 42. The elongated member 30 is further connected to the hitch assembly 42 through a bolt 47 connecting at one end of the elongated member 30. While in the preferred embodiment of the present invention, the spare tire assembly 10 is secured to the hitch assembly 42, it is also possible to connect the spare tire assembly 10 directly to the frame of the vehicle 12 by use of a pair of flanges and the transverse bar 45. As will readily occur to those skilled in the art, only minor modifications would be necessary to bypass the use of the hitch assembly 42.

Referring now to FIG. 4, a pivoting device 36 is provided which includes an upper hinge 37 and a lower hinge 38. Each hinge 37 and 38 includes a plastic bushing 33 positioned in a barrel 39. The lower hinge 38 has an arm 59 outwardly to engage a bolt 64 (FIG. 2) mounted to the ring 31 to limit the outward swing of the support arm. Each bushing 33 is supported on a rear end portion 32 of the elongated member 30 for rotation and is formed to prevent rattle and vibration. The annular support ring 31 is formed on the vertically extending rear end portion 321 to position the hinges 37 and 38 on the swing arm 50. A pivot support bracket 43 is further provided that extends from the elongated member 30 to the rear bumper of the vehicle 12 to further stabilize the elongated member 30.

A receiving fork 34 having an upper bar 35 spaced apart from a lower bar 36 is mounted to the transverse bar of the hitch mechanism 42 to receive the flange 57 of the stabilizing tongue 55. A rubber stop 58 is positioned between the upper bar 35 and lower bar 36 so that when the latch mechanism is engaged, the flange 57 of the stabilizing tongue is biased by the rubber stop 58 to stabilize the spare tire assembly 10.

As best seen in FIG. 4, the latch mechanism 66 is provided for detachable securement of the spare tire assembly 10 to the rear door 14 of the vehicle 12. The latch mechanism 66 further includes a striker assembly (not shown) and an L-shaped latch bracket. The striker assembly is attached by fasteners to the rear door 14 and includes an aperture to securely receive the latch bracket when the swing arm 50 is in the closed position. A handle 70 having an elongated shank 71 with cushioned hand grip is spring biased, such that exerting pressure on the handle 70 causes release of the latch bracket from the striker assembly and therefore allows for the pivotal movement of the swing arm 50 away from the vehicle 12.

As seen in FIGS. 1, 3, and 4, the spare tire assembly 10 is adapted for carrying the wheel 22. The wheel 22 is detachably secured to the swing arm 50 by the tire mounting mechanism 60. Attached to the second end section 56 of the swing arm 50 is a tire mounting plate 61. The tire mounting plate 61 has a plurality of bolt holes 63. The bolt holes 63 provide for engagement with the wheel 22. Once the wheel 22 is engaged with the tire mounting plate 61, nuts may be threadably attached to the bolts so as to secure the wheel 22 in place.

While the subject invention has been described with reference to a preferred embodiment, is understood that various other changes and modifications could be made therein by one skilled in the art without varying from the scope and spirit of the subject invention as defined in the appended claims.

We claim:

1. A swing-out spare tire assembly for use with a vehicle having a body and having a pair of frame members extending longitudinally beneath said body and having a rear end portion, said vehicle further having a bumper mounted transverse to said rear end portions of said frame members, said spare tire assembly comprising:

an elongated member adapted to be mounted beneath said pair of frame members, said elongated member being spaced apart from and extending parallel with said bumper;

a support member mounted to said elongated member, said support member extending beneath said bumper and having a rear end portion aligned on a generally vertical axis;

a swing arm pivotably mounted to said rear end portion of said support member, said swing arm mounted to pivot to and away from said vehicle about said vertical axis, said swing arm having means for removably mounting a spare tire thereto.

2. The spare tire assembly of claim 1, wherein said swing arm further comprises latch means for allowing for the displacement of said swing arm between a closed position whereby said swing arm is adjacent to a rear door and an open position whereby said swing arm extends laterally away from said vehicle.

3. The spare tire assembly of claim 2, wherein said vehicle further includes a rear door and wherein said latch means further comprises:

a striker assembly attached to said rear door of said vehicle;

a latch mechanism adapted to be releasably connected to said striker assembly, said latch mechanism being secured to said striker assembly when said swing arm is in said closed position;

a spring biased handle for releasing said latch mechanism from said striker assembly, such that said swing arm can freely pivot from said closed position to said open position.

4. The spare tire assembly of claim 1, wherein said swing arm further comprises:

a first section, secured to a pivoting means, said first section further comprising upper and lower tubes spaced apart from and parallel to each other, and a second section, fixably joined and perpendicular to said first section, said means for mounting a spare tire being coupled to said second section, said means permitting the removable attachment of a spare wheel thereon.

5. The spare tire assembly of claim 1, wherein said pivoting means for mounting said swing arm further comprises an upper hinge and a lower hinge, said upper hinge attached to said upper tube of said swing arm and said lower hinge attached to said lower tube of said swing arm, said first and second hinges further comprising substantially circular barrels.

6. The spare tire assembly of claim 1, further comprising:

a stabilizing tongue secured to said swing arm, said tongue having an outwardly extending flange; and a receiving fork secured to said hitch assembly, said flange being releasably connectable to said receiving fork to stabilize said swing arm when said swing arm is in said closed position.

7. The spare tire assembly of claim 6, wherein said receiving fork further comprises:

an upper bar and a lower bar, said upper bar spaced apart from said lower bar; and a rubber stop positioned between said upper bar and said lower bar, such that said flange is biased against said rubber stop when said swing arm is in said closed position.

8. The spare tire assembly of claim 1, wherein said hitch assembly further comprises a pair of flanges and a transverse bar extending therebetween.

9. The spare tire assembly of claim 1, further comprising a pair of flanges mounted to said elongated members, each of said flanges mounted to one of said pair of frame members.

10. The spare tire assembly of claim 1, further comprising a trailer hitch receiving member mounted to said elongated member.

11. A swing-out spare tire assembly for use with a vehicle having a body and having a pair of frame members extending longitudinally beneath said body, and having a rear end portion, said vehicle further having a mounted transverse to said rear end portion of said frame members, said spare tire assembly comprising:

a hitch assembly having a pair of flanges adapted to be mounted beneath said pair of frame members and an elongated member extending between the flanges;

a support member mounted to said hitch assembly, said support member extending beneath said bumper and having a rear end portion aligned on a generally vertical axis;

a swing arm pivotably mounted to said rear end portion of said support member, said swing arm mounted to pivot to and away from said vehicle about said vertical axis, said swing arm having means for removably mounting a spare tire thereto.

* * * * *

UNITED STATES PATENT AND TRADEMARK OFFICE
CERTIFICATE OF CORRECTION

PATENT NO. : 5,538,168
DATED : July 23, 1996
INVENTOR(S) : Edgar P. Burger and Robert J. Burger It is certified that error appears in the above-indentified patent and that said Letters Patent is hereby corrected as shown below:

Column 3, line 6, delete "rear door 14" and insert --assembly 10--;

Column 3, line 48, delete "assembly 10" and insert --rear door 14--.

Column 4, line 6, after "59", insert --extending--;

Column 4, line 12, delete "321", insert --32--;

Column 4, line 50, after "embodiment," insert --it--.

Column 6, line 28, after "having a", insert --bumper--.

Signed and Sealed this

Nineteenth Day of November, 1996

Attest:

BRUCE LEHMAN

Attesting Officer     Commissioner of Patents and Trademarks